(12) United States Patent
Ogihara et al.

(10) Patent No.: US 8,770,023 B2
(45) Date of Patent: Jul. 8, 2014

(54) ACCELERATION SENSOR MODULE WITH ATTITUDE DETERMINING FUNCTION

(75) Inventors: Katsuyuki Ogihara, Toyama (JP); Hiroaki Nakabayashi, Toyama (JP)

(73) Assignee: Hokuriku Electric Industry Co., Ltd., Toyama-Shi (JP)

( * ) Notice: Subject to any disclaimer, the term of this patent is extended or adjusted under 35 U.S.C. 154(b) by 275 days.

(21) Appl. No.: 13/390,647

(22) PCT Filed: Aug. 18, 2010

(86) PCT No.: PCT/JP2010/063924
§ 371 (c)(1),
(2), (4) Date: Feb. 15, 2012

(87) PCT Pub. No.: WO2011/021638
PCT Pub. Date: Feb. 24, 2011

(65) Prior Publication Data
US 2012/0137776 A1    Jun. 7, 2012

(30) Foreign Application Priority Data
Aug. 18, 2009   (JP) .................................. 2009-189170

(51) Int. Cl.
*G01P 15/18* (2013.01)
*G01P 3/04* (2006.01)

(52) U.S. Cl.
CPC ...................................... *G01P 15/18* (2013.01)
USPC ......................................... 73/514.01; 73/510

(58) Field of Classification Search
CPC ..... G01P 15/02; G01P 15/032; G01P 15/036; G01P 15/08; G01P 15/0802; G01P 15/0891; G01P 15/18; G01P 1/02; G01P 1/023; G01P 2015/0811; G01P 2015/0814; G01P 2015/0817; G01P 2015/082; G01P 2015/084; G01P 2015/0845; G01P 2015/0848; G01P 2015/0851; G01P 2015/0862; G01P 2015/0865
USPC ............................... 73/514.01, 510, 511, 493
See application file for complete search history.

(56) References Cited

U.S. PATENT DOCUMENTS

| 5,280,432 | A | | 1/1994 | Kuwana et al. | |
|---|---|---|---|---|---|
| 5,541,860 | A | * | 7/1996 | Takei et al. | 702/141 |
| 8,006,556 | B2 | * | 8/2011 | Sheynblat | 73/510 |

(Continued)

FOREIGN PATENT DOCUMENTS

| JP | 03-067769 | 3/1991 |
|---|---|---|
| JP | 10-173984 | 6/1998 |

(Continued)

*Primary Examiner* — Helen Kwok
(74) *Attorney, Agent, or Firm* — Rankin, Hill & Clark LLP

(57) ABSTRACT

An X-axis acceleration level determining section determines whether an X-axis acceleration signal output from a three-axis acceleration sensor has a value equal to or more than a predetermined positive threshold level, a value equal to or less than a predetermined negative threshold level, a value between the positive threshold level and a level of 0, or a value between the level of 0 and the negative threshold level. A Y-axis acceleration level determining section also makes a similar determination for a Y-axis acceleration signal output from the three-axis acceleration sensor. An attitude determining section determines the rotated attitude of a device equipped with the three-axis acceleration sensor with respect to the Z axis based on results of determinations made by the X-axis acceleration level determining section and the Y-axis acceleration level determining section.

6 Claims, 5 Drawing Sheets

(56) References Cited

U.S. PATENT DOCUMENTS

| | | | |
|---|---|---|---|
| 8,266,959 B2 * | 9/2012 | Lin | 73/493 |
| 2005/0160815 A1 * | 7/2005 | Lee | 73/514.15 |
| 2011/0307213 A1 * | 12/2011 | Zhao et al. | 702/153 |
| 2013/0111993 A1 * | 5/2013 | Wang | 73/514.01 |

FOREIGN PATENT DOCUMENTS

| | | |
|---|---|---|
| JP | 2004-240478 | 8/2004 |
| JP | 2009-100366 | 5/2009 |
| JP | 2009-122628 | 6/2009 |

\* cited by examiner

| DETERMINED IMAGE DIRECTION | a | b | c | d |
|---|---|---|---|---|
| |  |  |  |  |
| X-AXIS bit | 01 | 00 or 11 | 10 | 00 or 11 |
| Y-AXIS bit | 00 or 11 | 01 | 00 or 11 | 10 |
| IMAGE DIRECTION DETERMINING bit | 00 | 01 | 10 | 11 |

Fig. 4

CONDITIONS FOR SWITCHING SCREEN

● CONDITIONS FOR SWITCHING SCREEN FROM DIRECTION "a" to DIRECTIONS "b" TO "d"

| Y-AXIS<br>X-AXIS | 01 | 00 | 11 | 10 |
|---|---|---|---|---|
| 01 | 0101 | 0001 | 1101 | 1001 |
| 00 | 0100 | 0000 | 1100 | 1000 |
| 11 | 0111 | 0011 | 1111 | 1011 |
| 10 | 0101 | 0010 | 1110 | 1010 |

CONDITIONS FOR SWITCHING SCREEN

● CONDITIONS FOR SWITCHING SCREEN FROM DIRECTION "b" to DIRECTIONS "a", "c", AND "d"

| Y-AXIS<br>X-AXIS | 01 | 00 | 11 | 10 |
|---|---|---|---|---|
| 01 | 0101 | 0001 | 1101 | 1001 |
| 00 | 0100 | 0000 | 1100 | 1000 |
| 11 | 0111 | 0011 | 1111 | 1011 |
| 10 | 0101 | 0010 | 1110 | 1010 |

CONDITIONS FOR SWITCHING SCREEN

● CONDITIONS FOR SWITCHING SCREEN FROM DIRECTION "c" to DIRECTIONS "a", "b", AND "d"

| Y-AXIS<br>X-AXIS | 01 | 00 | 11 | 10 |
|---|---|---|---|---|
| 01 | 0101 | 0001 | 1101 | 1001 |
| 00 | 0100 | 0000 | 1100 | 1000 |
| 11 | 0111 | 0011 | 1111 | 1011 |
| 10 | 0110 | 0010 | 1110 | 1010 |

CONDITIONS FOR SWITCHING SCREEN

● CONDITIONS FOR SWITCHING SCREEN FROM DIRECTION "d" to DIRECTIONS "a" TO "c"

| Y-AXIS<br>X-AXIS | 01 | 00 | 11 | 10 |
|---|---|---|---|---|
| 01 | 0101 | 0001 | 1101 | 1001 |
| 00 | 0100 | 0000 | 1100 | 1000 |
| 11 | 0111 | 0011 | 1111 | 1011 |
| 10 | 0110 | 0010 | 1110 | 1010 |

A, B, C, D

ACCELERATION SENSOR MODULE WITH ATTITUDE DETERMINING FUNCTION

TECHNICAL FIELD

The present invention relates to an acceleration sensor module with an attitude determining function capable of determining the attitude of a device equipped with the module.

BACKGROUND ART

Japanese Patent Application Publication No. 10-173984 (Patent Document 1) discloses an electronic still camera configured to detect changes in attitude of the camera using a vertical orientation detecting sensor to allow an image to be seen always in an upright state according to the detected changes in attitude. Japanese Patent Application Publication No. 2004-240478 (Patent Document 2) discloses a portable electronic device configured to determine the attitude of the device using a gyro chip to allow an image to be seen always in an upright state according to changes in attitude of the device.

RELATED-ART DOCUMENT

Patent Document

Patent Document 1: Japanese Patent Application Publication No. 10-173984
Patent Document 2: Japanese Patent Application Publication No. 2004-240478

DISCLOSURE OF THE INVENTION

Technical Problem

Most of conventional attitude detecting sensors used in conventional image display devices that display an image always in an upright state are complicated in structure and expensive.

An object of the present invention is to provide an acceleration sensor module with an attitude determining function that facilitates detecting the attitude of a device equipped with the module and that is relatively inexpensive.

Solution to Problem

An acceleration sensor module with an attitude determining function according to the present invention includes a three-axis acceleration sensor configured to detect accelerations in X-axis, Y-axis, and Z-axis directions that are perpendicular to each other; an X-axis acceleration level determining section; a Y-axis acceleration level determining section; and an attitude determining section, which are formed as a single unit. The X-axis acceleration level determining section is configured to determine whether an X-axis acceleration signal output from the three-axis acceleration sensor has a value equal to or more than a predetermined positive threshold level, a value equal to or less than a predetermined negative threshold level, a value between the positive threshold level and a level of 0 (not inclusive), or a value between the level of 0 and the negative threshold level (not inclusive). The Y-axis acceleration level determining section is configured to determine whether a Y-axis acceleration signal output from the three-axis acceleration sensor has a value equal to or more than a predetermined positive threshold level, a value equal to or less than a predetermined negative threshold level, a value between the positive threshold level and a level of 0 (not inclusive), or a value between the level of 0 and the negative threshold level (not inclusive). The attitude determining section is configured to determine a rotated attitude of a device equipped with the acceleration sensor with respect to the Z axis based on results of determinations made by the X-axis acceleration level determining section and the Y-axis acceleration level determining section.

The acceleration sensor module with an attitude determining function according to the present invention forms a single unit with the existing three-axis acceleration sensor, and thus can be easily mounted on a device. In addition, the module facilitates determining the attitude of the device based on the result of comparison between outputs of the acceleration sensor and the threshold levels.

The X-axis acceleration level determining section and the Y-axis acceleration level determining section may each be configured to output the determination result as a 2-bit value, and the attitude determining section may be configured to output the determined attitude as a 2-bit value. This facilitates obtaining the determination result by reducing the number of bits required for an attitude determining operation. Preferably, the attitude determining section also determines a current attitude based on a combination of the 2-bit value indicating the preceding determined attitude, the 2-bit value output from the X-axis acceleration level determining section, and the 2-bit value output from the Y-axis acceleration level determining section. This enables attitude determination by utilizing arithmetic elements for use in signal processing performed by the three-axis acceleration sensor.

Preferably, the acceleration sensor module further includes first and second threshold level setting sections configured to changeably set the threshold levels used by the X-axis acceleration level determining section and the Y-axis acceleration level determining section. Providing such first and second threshold level setting sections allows threshold settings suitable for usage of the module, thereby increasing the versatility of the module.

BRIEF DESCRIPTION OF DRAWINGS

FIG. 4 shows conditions for switching from the screen "a" in FIG. 3 to the screen "b", "c", or "d".

FIG. 5 shows conditions for switching from the screen "b" in FIG. 3 to the screen "a", "c", or "d".

FIG. 6 shows conditions for switching from the screen "c" in FIG. 3 to the screen "a", "b", or "d".

FIG. 7 shows conditions for switching from the screen "d" in FIG. 3 to the screen "a", "b", or "c".

BEST MODE FOR CARRYING OUT THE INVENTION

Figure 1:
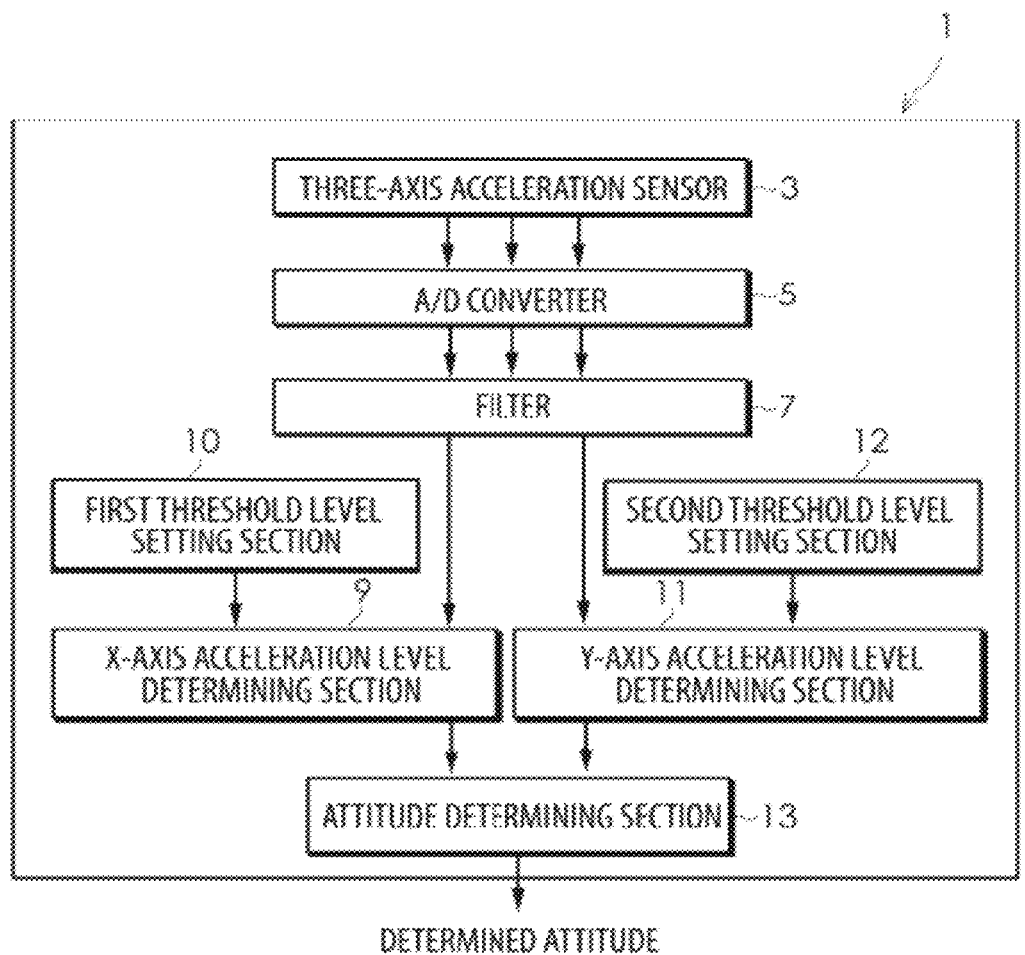
FIG. 1 shows an exemplary configuration of an acceleration sensor module with an attitude determining function according to an embodiment of the present invention.

An acceleration sensor module with an attitude determining function according to an embodiment of the present invention will be described in detail below with reference to the drawings. FIG. 1 shows an exemplary configuration of an acceleration sensor module 1 with an attitude determining function according to the embodiment of the present invention. The acceleration sensor module 1 is formed as a single unit. The acceleration sensor module 1 includes a three-axis acceleration sensor 3 such as a semiconductor acceleration sensor or a capacitance-type acceleration sensor, which is capable of constantly detecting accelerations including gravitational accelerations to output the detected accelerations. The three-axis acceleration sensor 3 detects accelerations in X-axis, Y-axis, and Z-axis directions, which are orthogonal to each other, to output analog X-axis, Y-axis, and Z-axis acceleration signals corresponding to the accelerations detected in the respective axis directions. An A/D converter 5 converts the analog X-axis, Y-axis, and Z-axis acceleration signals into digital X-axis, Y-axis, and Z-axis signals. A filter 7 removes noise or the like from the digital X-axis, Y-axis, and Z-axis signals. In the embodiment, the digital X-axis acceleration signal and the digital Y-axis acceleration signal output from the filter 7 are input to an X-axis acceleration level determining section 9 and a Y-axis acceleration level determining section 11, respectively. A first threshold level setting section 10 changeably sets a negative threshold level and a positive threshold level, as discussed later, for the X-axis acceleration level determining section 9. A second threshold level setting section 12 changeably sets a negative threshold level and a positive threshold level, as discussed later, for the Y-axis acceleration level determining section 11. Providing the first and second threshold level setting sections 10 and 12 allows threshold level settings suitable for usage of the module, thereby enhancing the versatility of the module.

The X-axis acceleration level determining section 9 determines, based on digital signal processing, whether the X-axis acceleration signal output from the three-axis acceleration sensor 3 has a value equal to or more than a predetermined positive threshold level (+VRx), a value equal to or less than a predetermined negative threshold level (−VRx), a value from a level of 0 to the positive threshold level (+VRx) (not inclusive), or a value from the negative threshold level to the level of 0 (−VRx) (not inclusive). The Y-axis acceleration level determining section 11 determines, through digital signal processing, whether the Y-axis acceleration signal output from the three-axis acceleration sensor 3 has a value equal to or more than a predetermined positive threshold level (+VRy), a value equal to or less than a predetermined negative threshold level (−VRy), a value from a level of 0 to the positive threshold level (+VRy) (not inclusive), or a value from the negative threshold level to the level of 0 (−VRy) (not inclusive). An attitude determining section 13 determines the rotated attitude of a device equipped with the three-axis acceleration sensor 3 with respect to the Z axis based on the results of determinations made by the X-axis acceleration level determining section 9 and the Y-axis acceleration level determining section 11.

Figure 2:
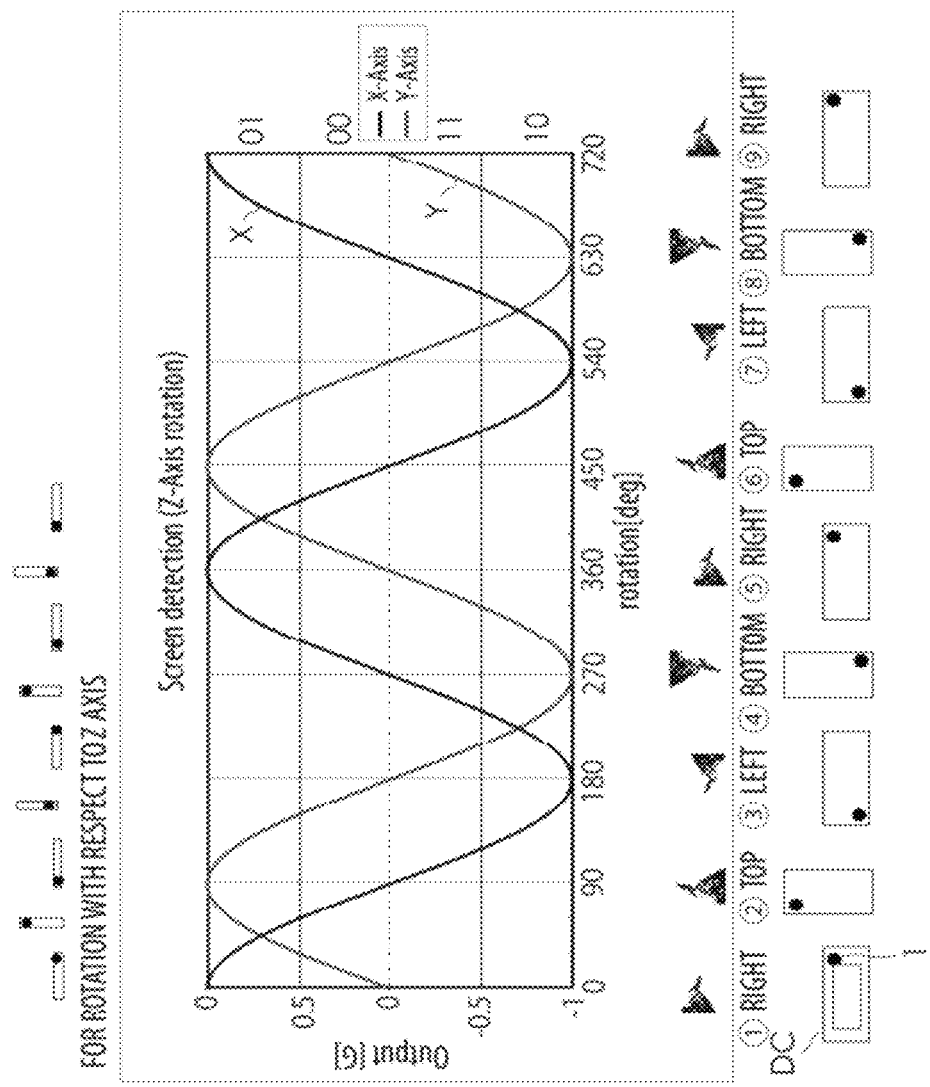
FIG. 2 shows the relationship among outputs of a three-axis acceleration sensor, the attitude of a digital camera equipped with the acceleration sensor module with an attitude determining function according to the embodiment, and an image displayed on the digital camera obtained while rotating the digital camera with respect to a Z axis.

FIG. 2 shows the relationship among the outputs of the three-axis acceleration sensor 3 (the X-axis acceleration signal and the Y-axis acceleration signal), the attitude of a digital camera DC (portable image display device) equipped with the acceleration sensor module 1 with an attitude determining function according to the embodiment, and an image displayed on the digital camera DC obtained while rotating the digital camera DC with respect to the Z axis. In the embodiment, the predetermined positive threshold level (+VRx) and the predetermined negative threshold level (−VRx) for the X-axis acceleration signal are defined as 0.5 G and −0.5 G, respectively. The predetermined positive threshold level (+VRy) and the predetermined negative threshold level (−VRy) for the Y-axis acceleration signal are defined as 0.5 G and −0.5 G, respectively. In the digital camera DC shown in FIG. 2, the position of the acceleration sensor module 1 is indicated by a black dot ●.

Each of the X-axis acceleration signal and the Y-axis acceleration signal alternately becomes above and below the upper threshold level, and alternately becomes below and above the lower threshold level at intervals of 90 degrees, when the digital camera DC is rotated with respect to the Z axis. Thus, in the embodiment, the result of comparison of each signal with the threshold levels is output as a 2-bit value. Specifically, the X-axis acceleration level determining section 9 and the Y-axis acceleration level determining section 11 each output the determination result as a 2-bit value. More specifically, the X-axis acceleration level determining section 9 and the Y-axis acceleration level determining section 11 each represent the determination result as a 2-bit value of "01" if the X-axis acceleration signal or the Y-axis acceleration signal output from the three-axis acceleration sensor 3 is a value equal to or more than the positive threshold level (+0.5 G), as a 2-bit value of "10" if the output acceleration signal is a value equal to or less than the negative threshold level (−0.5 G), as a 2-bit value of "00" if the output acceleration signal is a value between the positive threshold level (+0.5 G) and a level of 0, and as a 2-bit value of "11" if the output acceleration signal is a value between the level of 0 and the negative threshold level (−0.5 G).

Figure 3:
FIG. 3 shows the relationship between the results of determinations made by an X-axis acceleration level determining section and a Y-axis acceleration level determining section, and the attitude determined by an attitude determining section.
Figure 3:
Figure 3:
Figure 3:

In the embodiment, the attitude determining section 13 is also configured to output the determined attitude as a 2-bit value. Specifically, as shown in FIG. 3, the attitude determining section 13 determines the direction of the image according to the results (2-bit values) of determinations made by the X-axis acceleration level determining section 9 and the Y-axis acceleration level determining section 11. In the example of FIG. 3, if the result (2-bit value) of determination made by the X-axis acceleration level determining section 9 is "01" and the result (2-bit value) of determination made by the Y-axis acceleration level determining section 11 is "00" or "11", the determined attitude (2-bit value) is "00", which results in display of an upright image on the screen. If the result (2-bit value) of determination made by the X-axis acceleration level determining section 9 is "00" or "11" and the result (2-bit value) of determination made by the Y-axis acceleration level determining section 11 is "01", the determined attitude (2-bit value) is "01", which results in display of a rightward rotated image on the screen. If the result (2-bit value) of determination made by the X-axis acceleration level determining section 9 is "10" and the result (2-bit value) of determination made by the Y-axis acceleration level determining section 11 is "00" or "11", the determined attitude (2-bit value) is "10", which results in display of an inverted upright image on the screen. If the result (2-bit value) of determination made by the X-axis acceleration level determining section 9 is "00" or "11" and the result (2-bit value) of determination made by the Y-axis acceleration level determining section 11 is "10", the determined attitude (2-bit value) is "11", which results in display of a leftward rotated image on the screen.

In the embodiment, if the screen is changed according to the determined attitude, no image is displayed between the upright image and the rightward rotated image shown in the example of FIG. 3, between the rightward rotated image and the inverted upright image, between the inverted upright image and the leftward rotated image, and between the leftward rotated image and the upright image. That is, the image determined according to the last determined attitude is kept displayed until the attitude determining section 13 outputs one of the determined attitudes corresponding to the determined image directions "00", "01", "10", and "11" shown in FIG. 3.

FIG. 4 shows conditions for switching from the screen "a" in FIG. 3 to the screen "b", "c", or "d". In FIG. 4, the range indicated by symbol A corresponds to conditions for switching to the screen "a", the range indicated by symbol B corresponds to conditions for switching to the screen "b", the range indicated by symbol C corresponds to conditions for switching to the screen "c", and the range indicated by symbol D corresponds to conditions for switching to the screen "d". In FIG. 4, all the regions other than the regions A to D (regions displayed in the same color as the region A) correspond to conditions that leave the screen "a" unchanged. In the state of FIG. 4, if the digital camera is rotated in a usual manner, it is likely that the conditions indicated by the region A change to the conditions indicated by the regions B and D.

FIG. 5 shows conditions for switching from the screen "b" in FIG. 3 to the screen "a", "c", or "d". In FIG. 5, the range indicated by symbol A corresponds to conditions for switching to the screen "a", the range indicated by symbol B corresponds to conditions for switching to the screen "b", the range indicated by symbol C corresponds to conditions for switching to the screen "c", and the range indicated by symbol D corresponds to conditions for switching to the screen "d". In FIG. 5, all the regions other than the regions A to D (regions displayed in the same color as the region B) correspond to conditions that leave the screen "b" unchanged. In the state of FIG. 5, if the digital camera is rotated in a usual manner, it is likely that the conditions indicated by the region B change to the conditions indicated by the regions A and C.

FIG. 6 shows conditions for switching from the screen "c" in FIG. 3 to the screen "a", "b", or "d". In FIG. 6, the range indicated by symbol A corresponds to conditions for switching to the screen "a", the range indicated by symbol B corresponds to conditions for switching to the screen "b", the range indicated by symbol C corresponds to conditions for switching to the screen "c", and the range indicated by symbol D corresponds to conditions for switching to the screen "d". In FIG. 6, all the regions other than the regions A to D (regions displayed in the same color as the region C) correspond to conditions that leave the screen "c" unchanged. In the state of FIG. 6, if the digital camera is rotated in a usual manner, it is likely that the conditions indicated by the region C change to the conditions indicated by the regions B and D.

FIG. 7 shows conditions for switching from the screen "d" in FIG. 3 to the screen "a", "b", or "c". In FIG. 7, the range indicated by symbol A corresponds to conditions for switching to the screen "a", the range indicated by symbol B corresponds to conditions for switching to the screen "b", the range indicated by symbol C corresponds to conditions for switching to the screen "c", and the range indicated by symbol D corresponds to conditions for switching to the screen "d". In FIG. 7, all the regions other than the regions A to D (regions displayed in the same color as the region D) correspond to conditions that leave the screen "d" unchanged. In the state of FIG. 7, if the digital camera is rotated in a usual manner, it is likely that the conditions indicated by the region D change to the conditions indicated by the regions A and C.

When the acceleration sensor module 1 according to the embodiment is utilized in the digital camera DC, changing the image as shown in FIG. 3 does not make any difference in effect of image display compared to when no attitude detection is performed. Thus, in order for the digital camera DC to utilize the attitude determined by the attitude determining section 13, specifically, image processing may be performed utilizing the attitude determined by the attitude determining section 13 such that the image is displayed in the upright state irrespective of changes in attitude of the digital camera DC. The image processing allows the image to be displayed in the upright state even if the direction of the screen is changed from the state "a" in FIG. 3 to the state "b" in FIG. 3. That is, if the attitude determining section 13 determines that the direction of the screen has changed from the state "a" in FIG. 3 to the state "b" in FIG. 3, image processing is performed such that the image is rotated in the direction opposite to the direction of the change in attitude by an angle corresponding to the change in attitude.

INDUSTRIAL APPLICABILITY

The acceleration sensor module with an attitude determining function according to the present invention forms a single unit including the existing three-axis acceleration sensor, and thus can be easily mounted on a device. In addition, the acceleration sensor module facilitates determining the attitude of the device based on the result of comparison of outputs of the acceleration sensor with threshold levels.

SIGH LISTING

1 Acceleration sensor module with attitude determining function
3 Three-axis acceleration sensor
5 A/D converter
7 Filter
9 X-axis acceleration level determining section
10 First threshold level setting section
11 Y-axis acceleration level determining section
12 Second threshold level setting section
13 Attitude determining section

The invention claimed is:
1. An acceleration sensor module with an attitude determining function, comprising:
   a three-axis acceleration sensor configured to detect accelerations in X-axis, Y-axis, and Z-axis directions that are perpendicular to each other;
   an X-axis acceleration level determining section configured to determine whether an X-axis acceleration signal output from the three-axis acceleration sensor has a value equal to or more than a predetermined positive threshold level, a value equal to or less than a predetermined negative threshold level, a value between the positive threshold level and a level of 0, or a value between the level of 0 and the negative threshold level;
   a Y-axis acceleration level determining section configured to determine whether a Y-axis acceleration signal output from the three-axis acceleration sensor has a value equal to or more than a predetermined positive threshold level, a value equal to or less than a predetermined negative threshold level, a value between the positive threshold level and a level of 0, or a value between the level of 0 and the negative threshold level; and
   an attitude determining section configured to determine a rotated attitude of a device equipped with the acceleration sensor with respect to the Z-axis direction based on results of determinations made by the X-axis acceleration level determining section and the Y-axis acceleration level determining section, wherein:
   the three-axis acceleration sensor, the X-axis acceleration level determining section, the Y-axis acceleration level determining section, and the attitude determining section are formed as a single unit;

the X-axis acceleration level determining section and the Y-axis acceleration level determining section each output the determination result as a 2-bit value, and the attitude determining section outputs the determined attitude as a 2-bit value; and the attitude determining section determines a current attitude based on a combination of the 2-bit value indicating a preceding determined attitude, the 2-bit value output from the X-axis acceleration level determining section, and the 2-bit value output from the Y-axis acceleration level determining section.

2. The acceleration sensor module according to claim 1, further comprising:

first and second threshold level setting sections configured to changeably set the positive and negative threshold levels used by the X-axis acceleration level determining section and the Y-axis acceleration level determining section.

3. An acceleration sensor module with an attitude determining function, comprising:

a three-axis acceleration sensor configured to detect accelerations in X-axis, Y-axis, and Z-axis directions that are perpendicular to each other;

an X-axis acceleration level determining section configured to determine whether an X-axis acceleration signal output from the three-axis acceleration sensor has a value equal to or more than a predetermined positive threshold level, a value equal to or less than a predetermined negative threshold level, a value between the positive threshold level and a level of 0, or a value between the level of 0 and the negative threshold level;

a Y-axis acceleration level determining section configured to determine whether a Y-axis acceleration signal output from the three-axis acceleration sensor has a value equal to or more than a predetermined positive threshold level, a value equal to or less than a predetermined negative threshold level, a value between the positive threshold level and a level of 0, or a value between the level of 0 and the negative threshold level; and an attitude determining section configured to determine a rotated attitude of a device equipped with the acceleration sensor with respect to the Z-axis direction based on results of determinations made by the X-axis acceleration level determining section and the Y-axis acceleration level determining section, wherein the three-axis acceleration sensor, the X-axis acceleration level determining section, the Y-axis acceleration level determining section, and the attitude determining section are formed as a single unit.

4. The acceleration sensor module according to claim 3, wherein the X-axis acceleration level determining section and the Y-axis acceleration level determining section each output the determination result as a 2-bit value, and the attitude determining section outputs the determined attitude as a 2-bit value.

5. The acceleration sensor module according to claim 3, wherein the attitude determining section determines a current attitude based on a combination of the 2-bit value indicating a preceding determined attitude, the 2-bit value output from the X-axis acceleration level determining section, and the 2-bit value output from the Y-axis acceleration level determining section.

6. The acceleration sensor module according to claim 3, further comprising:

first and second threshold level setting sections configured to changeably set the positive and negative threshold levels used by the X-axis acceleration level determining section and the Y-axis acceleration level determining section.

* * * * *